Figure 1:
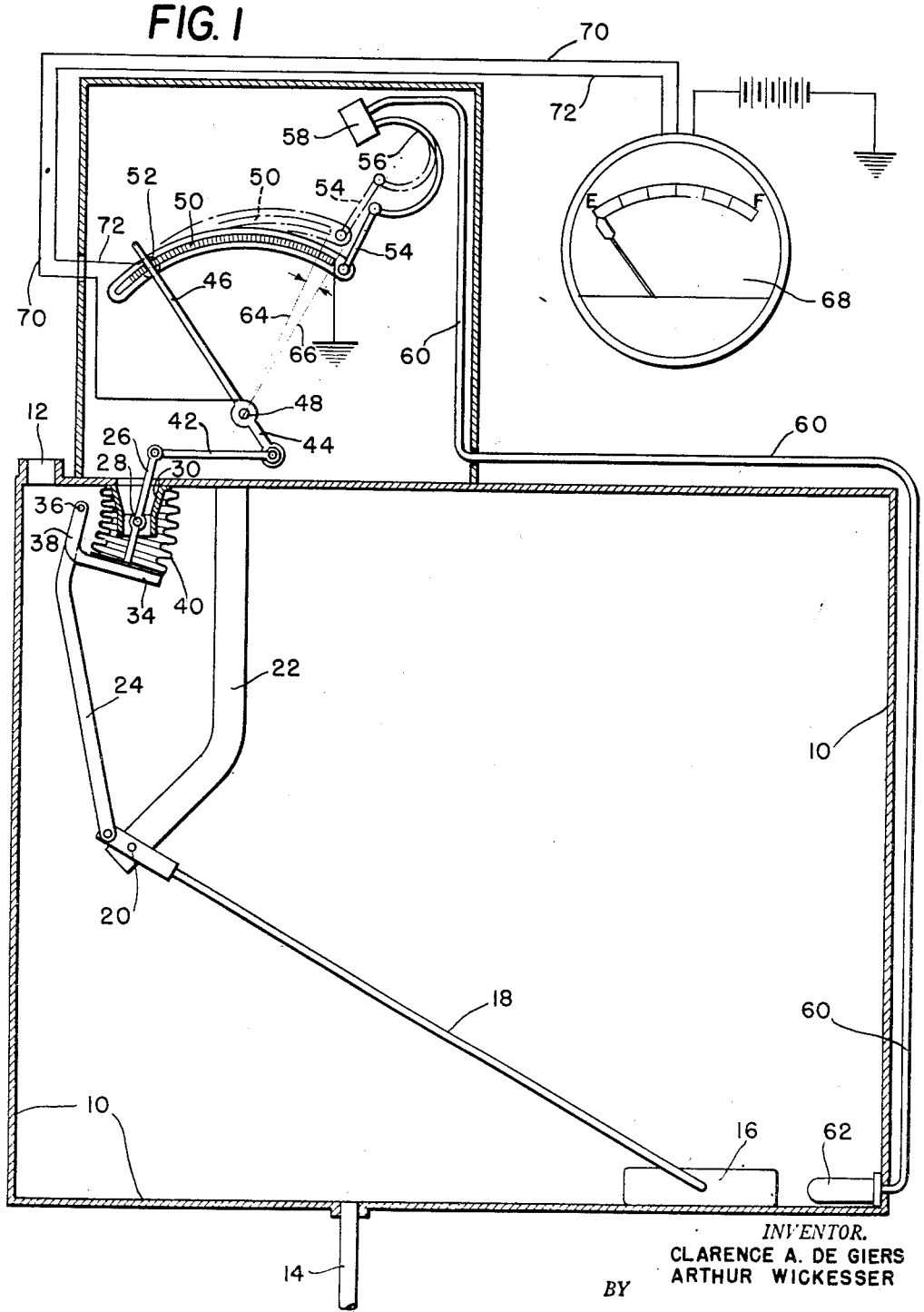

May 8, 1951  C. A. DE GIERS ET AL  2,551,793
DEVICE FOR INDICATING WEIGHT OF TANK CONTENTS
Filed Aug. 12, 1948  2 Sheets-Sheet 1

INVENTOR.
CLARENCE A. DE GIERS
ARTHUR WICKESSER
BY
Robert S. Dunham
ATTORNEY

Patented May 8, 1951

2,551,793

UNITED STATES PATENT OFFICE 2,551,793

DEVICE FOR INDICATING WEIGHT OF TANK CONTENTS

Clarence A. de Giers, Forest Hills, and Arthur Wickesser, St. Albans, N. Y., assignors to The Liquidometer Corporation, Long Island City, N. Y., a corporation of Delaware Application August 12, 1948, Serial No. 43,828

6 Claims. (Cl. 73—313)

This invention pertains to a gauge for indicating the liquid contents of a container or tank by means of a float riding on the liquid in the tank. An object of the invention is to incorporate in the instrument a thermal element which compensates for differences in temperature of the liquid in order that the gauge may be graduated in units of weight, such as pounds or grams, instead of units of volume, such as gallons or litres.

The usefulness of this invention may readily be understood by considering a gasoline tank in an airplane which is exposed to widely varying temperatures. The gasoline in the tank will expand and contract, and its density will change accordingly. The volume of the liquid might vary widely with the total power energy of the gasoline remaining unchanged. It is therefore desirable to have the tank contents gauge indicate weight instead of volume, because only weight gives a true indication of the available energy in the tank.

In summary, the present invention includes a float arranged to float on the liquid in the container and mechanically connected to an arm, which is pivoted at a fixed point, so as to move this arm about such point as a center in response to variations in the volume of the liquid, i. e. the liquid level. Cooperating with this arm, in either one of two ways, as hereinafter set forth, is a sector-shaped member, which is pivoted on an axis parallel with and spaced from the axis of said arm and which is arranged to be moved around its pivotal axis in response to the temperature of said liquid. The cooperation between the arm and the sector-shaped member serves either directly to indicate the weight of liquid in the container or to cooperate as an electrical transmitter of a telemetering system of conventional design for indicating such weight at a remote point by the use of a conventional indicating instrument, such as a ratiometer. When used in this latter sense, the sector-shaped member carries an electrical resistance, which may be connected as a rheostat resistance or as a potentiometer resistance and used as a voltage divider, the arm in either instance serving as an electrical contact member of the rheostat or voltage divider.

Two forms of means for moving the sector-shaped member are shown, one of which includes a Bourdon tube and the other a bellows. In both cases there is provided a fluid-containing system, adapted to be filled with a thermally expansible fluid, and having a bulb or chamber-forming portion arranged in the container, so that the fluid in such system will expand and contract in accordance with the temperature of the liquid, the weight of which is to be indicated. If desired, adjusting means may be provided as a set-up adjustment to assure that the initial indications are accurate. Adjusting means may also or alternatively be provided for adjustment of the multiplying factor between the movement of the bellows or other fluid motor and the movement of the sector-shaped member, so as to compensate for liquids having different coefficients of thermal expansion, which may be contained in the container from time to time and the weight of which is to be measured. It will be understood that either or both of these set-up adjustments may be omitted when the system is to be used solely for a given liquid, in which event the parts may be initially formed of the exact proper dimensions and may be initially properly located.

This application is related to the following copending applications of the same joint inventors, Ser. Nos. 34,586 and 41,488, filed respectively June 23, 1948, and July 30, 1948. The present case is also related to a sole application of De Giers, one of the present joint inventors, Ser. No. 41,426, filed July 30, 1948. All these cases are owned in common with the present case. The lines of division between these cases are based upon the following principles:

(1) The three joint applications, including the present case, have priority in the order of their respective filing dates.

(2) The sole application of De Giers is junior to all the joint applications, including the present case.

Applying these principles and in view of the difference between the subject matter of the present case and the sole application of De Giers, all the claims of the present case are readable solely upon the disclosure of the present case and not upon any of the other related cases aforesaid.

Further and other objects and advantages will be apparent from the specification and claims, and from the accompanying drawings which illustrate what is now considered the preferred embodiment of the invention.

Figure 2:
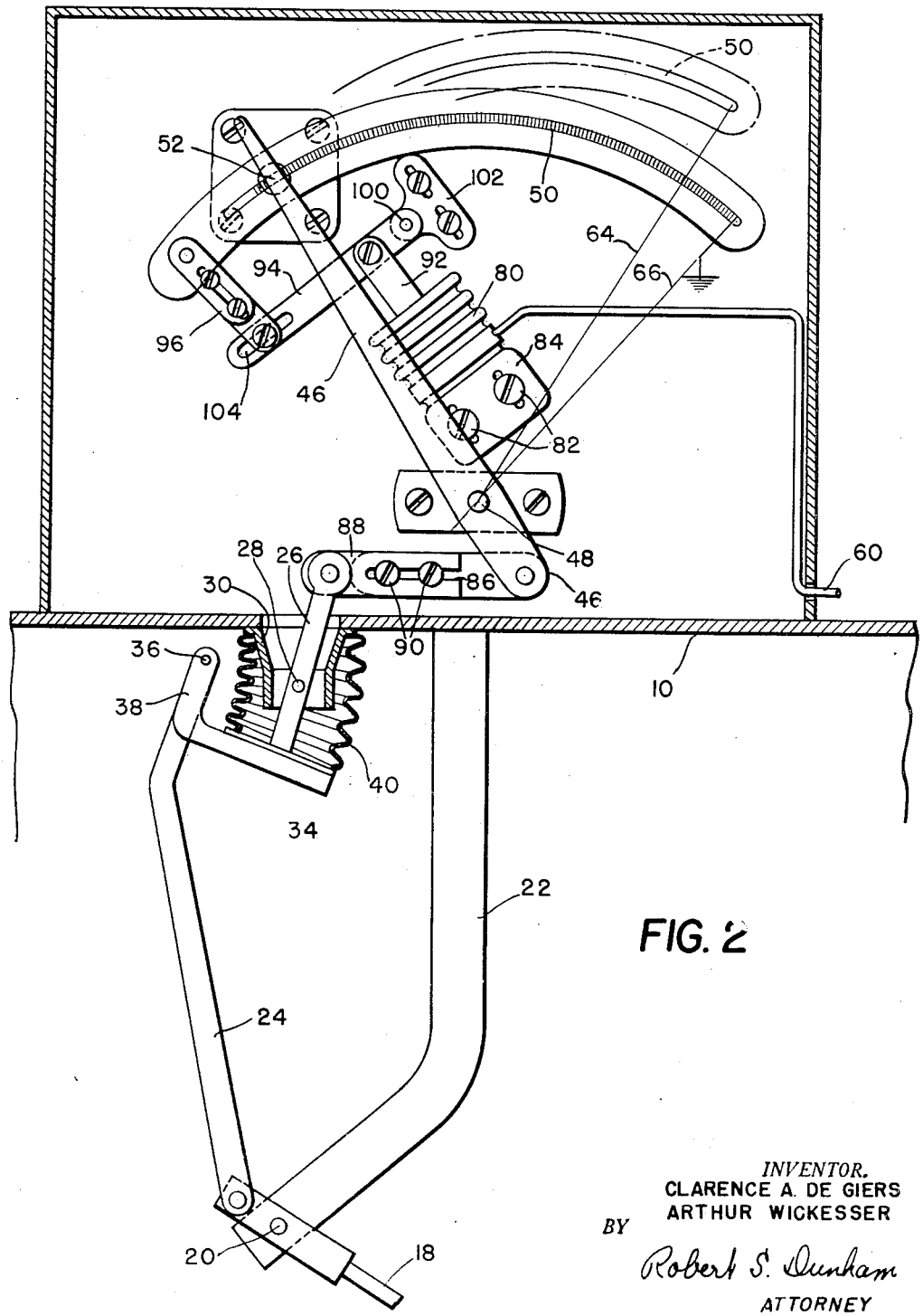

In the drawings:

Fig. 1 is a view of the invention, largely schematic and with some parts shown in elevation and others in vertical section, showing the float in its lowermost position with the indicator arm in zero position and with the contact strip in two positions it may assume, according to temperature; and Fig. 2 is a similar view of a part only of the elements of Fig. 1, on an enlarged scale and showing a modified form of the invention.

In Fig. 1 the container or tank 10 has a filler opening 12 and an outlet 14.

Float 16, which rises and falls with the level of the tank contents, is mounted on an arm 18 pivoted at 20 on a support 22 within and rigid with the tank 10.

Arm 18, through bent link 24, actuates lever 26, pivoted at 28 in a funnel-like bracket 30 attached to the top of the tank. The lower end of lever 26 is rigidly attached to a plate 34, which is pivotally connected at 36, by an integral, upstanding arm 38, to the upper end of link 24, so that as the float rises and falls, lever 26 will swing on its pivot 28. Bracket 30 is enclosed by a readily flexible bellows 40 sealed at its upper and lower ends to the top of the tank and to plate 34 respectively.

It will be clear from the above that as float 16 rises and falls with the level of the tank contents, lever 26 will swing on its pivot 28 in harmony with the float movement.

The upper end of lever 26 is connected by substantially horizontal link 42 to the lower end 44 of an arm 46, pivoted at 48, and having its upper end in electrical contact with the arcuate resistance strip 50, which is mounted in a swingable structure pivoted at 52, which is the zero point of the resistance strip. If desired, the electrical elements of the present invention may be entirely omitted and the swingable structure, shown as carrying the resistance strip 50, graduated and used directly in conjunction with the arm 46 as a visual indicator. Such a practice is in accordance with the teachings contained in the patent to De Giers, one of the present joint inventors, No. 2,382,695, issued August 14, 1945. From this point of view the resistance strip may be considered a "scale." Also when generally considered the element numbered 50 may be properly described as a sector-shaped member which cooperates with the arm 46 in determining the indication to be given of the liquid contents of the container or tank. This is so whether the element 50 is itself graduated as aforesaid or whether it is used to carry a resistance element as herein specifically shown and described. It will be understood that if this element is graduated as aforesaid the point on the scale at the axis of the pivot 52 will be graduated as zero.

The other end of structure carrying the resistance strip 50 is connected by a link 54 to the outer free end of a Bourdon tube 56, which is anchored at 58 and is connected by capillary tube 60 to a thermometer bulb 62 in the bottom of tank 10. The usual thermally expansible fluid in the bulb is always subject to the temperature of the tank liquid, and tube 60 changes, or maintains, its curvature in characteristic manner (as indicated by broken lines) under control of the fluid in bulb 62 and in the tube 60 and the Bourdon tube 56, thereby moving strip 50 about its pivot 52 (as indicated by broken lines). Thus, as the density of the liquid in the container or tank 10 increases or decreases with temperature, the effective length of strip 50 varies accordingly, between limits indicated by radial lines 64 and 66, so that the readings on indicator 68 may be graduated to indicate weight, instead of volume, of the tank contents.

The electrical connections and the electrical indicating instrument shown diagrammatically in the present case may be arranged as specifically taught in the patent to De Giers, one of the present inventors, No. 2,358,910. Alternatively, this system could be as disclosed particularly in either of the Lingel patents, Nos. 2,391,057 or 2,391,058, both granted December 18, 1945.

In other words, when the temperature of the liquid in the tank rises or falls and its volume increases or decreases in accordance with the temperature, pointer 46 must travel further, or not so far, to reach any given indication on the chart, the change in travel being proportional to the change in the volume due to the higher or lower temperature, thus always giving indications of volume as modified by temperature.

The indicator circuit may include arm 46, line 70, line 72, and that portion of strip 50 between its zero point 52 and the contact point of arm 46 on strip 50. As shown the end of strip 50 opposite its zero point is grounded.

Fig. 2 shows a modified form of the invention in which additional means of adjustment are provided and in which the Bourdon tube 56 is replaced by a bellows 80, one end of which is adjustably supported by screws 82 passing through elongate holes in a bracket 84.

The upper end of lever 26 is connected to the lower end of arm 46 by an adjustable-length link consisting of overlapping slotted elements 86, 88 held together in any adjusted position by screws 90.

As bellows 80 changes length under the influence of the thermally expansible fluid in capillary tube 60, strip 50 is swung around its zero point 52 by bellows stem 92, lever 94 and link 96. Lever 94 is fulcrumed at 100 on adjustably positioned bracket 102. Link 96 is adjustable in length, as indicated, and the effective length of lever 94 is adjustable by slot 104 at any point of which the link 96 may be articulated.

It is to be understood that the invention is not limited to the specific embodiment herein illustrated and described, but may be used in other ways without departure from its spirit as defined by the following claims.

We claim:

1. Apparatus for indicating the liquid contents of a container in units of weight, comprising a float arranged to float on the liquid in the container, an arm pivoted on a fixed axis, means mechanically interconnecting said float and said arm so that said arm will be moved and positioned in accordance with the level of the liquid in the container, a sector-shaped member with which said arm cooperates in determining the indication to be given of the liquid contents of the container, means pivoting said sector-shaped member for movement about an axis parallel to and fixed in respect to said fixed axis of said arm and located at the point on said sector-shaped member intersected by said arm when a zero liquid content of said container is to be indicated, and means independent of said float and responsive to the temperature of the liquid in said container for moving said sector-shaped member about its axis of movement, so as to interpose a temperature correction into the indication resulting from the cooperation of said sector-shaped member and said arm, so that the indication produced is accurately indicative of the weight of the liquid in the container independently of variations in the volume of said liquid resulting from changes in its temperature.

2. Apparatus in accordance with claim 1, wherein said temperature responsive means comprises means forming a closed system for containing a thermally-expansible fluid and having a portion thereof in heat transfer relationship with the liquid in said container, so that said fluid will expand and contract in accordance with the temperature of said liquid, a Bourdon tube forming a part of said system and movable in accordance with the expansion of said fluid in proportion to the temperature of said liquid, and means mechanically connecting said Bourdon tube with said sector-shaped member so as to move such member about its axis in accordance with the temperature of said liquid.

3. Apparatus for indicating the liquid contents of a container in units of weight, comprising a float arranged to float on the liquid in the container, an arm pivoted on a fixed axis, means mechanically interconnecting said float and said arm so that said arm will be moved and positioned in accordance with the level of the liquid in the container, a sector-shaped member with which said arm cooperates in determining the indication to be given of the liquid contents of the container, means pivoting said sector-shaped member for movement about an axis parallel to and fixed in respect to said fixed axis of said arm and located at the point on said sector-shaped member intersected by said arm when a zero liquid content of said container is to be indicated, means comprising a closed fluid-containing system, independent of said float and having a chamber-forming portion of said system disposed in said container adjacent to the bottom thereof, so as to be exposed externally to said liquid so that a thermally expansible fluid in said system may expand and contract in accordance with the temperature of said liquid, a bellows forming a part of said system and connected to said chamber-forming portion so as to expand and contract in accordance with the expansion and contraction of the fluid in said system, and means mechanically connecting said bellows to said sector-shaped member to swing such member about its axis in accordance with the temperature of said liquid, so as to interpose a temperature correction into the indication resulting from the cooperation of said sector-shaped member and said arm, so that the indication produced is accurately indicative of the weight of the liquid in the container independently of variations in the volume of said liquid resulting from changes in its temperature.

4. Apparatus in accordance with claim 5, wherein the mechanical system including said bellows and said means mechanically connecting said bellows to said sector-shaped member includes at least one element which is adjustable as a set-up adjustment to predetermine the position of said sector-shaped member for a given temperature of the liquid in said container.

5. Apparatus in accordance with claim 5, wherein said means mechanically connecting said bellows to said sector-shaped member includes an adjustable variable length lever, so as to provide an adjustably variable multiplying factor between the bellows movement and the movement of said sector-shaped member, whereby to provide an adjustment to compensate for liquids having different coefficients of thermal expansion which may be contained in said container from time to time.

6. Apparatus in accordance with claim 5, wherein the mechanical system including said bellows and said means mechanically connecting said bellows to said sector-shaped member includes means adjustably connecting said bellows to a support, providing for an adjustment of said bellows in a direction parallel to the movement of the free end thereof, a lever mechanically connected to said bellows to be swung about a fixed center by said bellows, means for adjustably positioning the fixed center about which said lever swings in a direction parallel to the movement of the free end of said bellows, a link connecting said lever to a part of said sector-shaped member, means for adjustably determining the point of connection between said lever and said link, so as adjustably to determine the multiplying factor between the bellows movement and movement of said sector-shaped member resulting therefrom, and means for adjustably determining the length of said link, whereby to provide a set-up adjustment for determining the position of said sector-shaped member for a given temperature of said liquid and also to compensate for liquids having different coefficients of thermal expansion which may be contained in said container from time to time.

CLARENCE A. DE GIERS.
ARTHUR WICKESSER.

REFERENCES CITED

The following references are of record in the file of this patent:

UNITED STATES PATENTS

| Number | Name | Date |
| --- | --- | --- |
| 1,972,146 | Johnson | Sept. 4, 1934 |
| 2,088,032 | Noble | July 27, 1937 |
| 2,264,487 | Smulski | Dec. 2, 1941 |
| 2,332,288 | Zeitlin | Oct. 19, 1943 |
| 2,382,695 | De Giers | Aug. 14, 1945 |
| 2,409,073 | Sias et al. | Oct. 8, 1946 |